United States Patent [19]
Pratt

[11] Patent Number: 5,115,683
[45] Date of Patent: May 26, 1992

[54] CORIOLIS MASS FLOW METER ADAPTED FOR LOW FLOW RATES

[75] Inventor: Wayne Pratt, Scottsdale, Ariz.

[73] Assignee: K-Flow Division of Kane Steel Co., Inc., Millville, N.J.

[21] Appl. No.: 404,919

[22] Filed: Sep. 8, 1989

Related U.S. Application Data

[63] Continuation-in-part of Ser. No. 249,805, Sep. 27, 1988, abandoned.

[51] Int. Cl.⁵ .............................................. G01F 1/84
[52] U.S. Cl. .................................................. 73/861.38
[58] Field of Search ............... 73/32 A, 861.37, 861.38

[56] References Cited

U.S. PATENT DOCUMENTS

| | | | |
|---|---|---|---|
| Re. 31,450 | 11/1983 | Smith | 73/861.38 |
| 2,752,173 | 6/1956 | Krooss | 285/129 |
| 3,108,475 | 10/1963 | Henderson . | |
| 3,339,400 | 9/1967 | Banks | 73/32 A |
| 3,355,944 | 12/1967 | Sipin . | |
| 3,447,723 | 5/1969 | Wakefield | 73/32 |
| 3,927,565 | 12/1975 | Pavlin et al. . | |
| 4,109,524 | 8/1978 | Smith . | |
| 4,252,028 | 2/1981 | Smith et al. | 73/861.38 |
| 4,354,377 | 10/1982 | Stansfeld | 73/32 |
| 4,381,680 | 5/1988 | Shiota | 73/861.38 |
| 4,703,660 | 11/1987 | Brenneman | 73/861.38 |
| 4,711,132 | 12/1987 | Dahlin | 72/861.38 |
| 4,716,771 | 1/1988 | Kane | 73/861.38 |
| 4,730,501 | 3/1988 | Levien | 73/861.38 |
| 4,733,569 | 3/1988 | Kelsey et al. | 73/861.38 |
| 4,747,312 | 5/1988 | Herzl | 73/861.38 |
| 4,756,198 | 7/1988 | Levien | 73/861.38 |
| 4,777,833 | 10/1988 | Carpenter | 73/861.38 |
| 4,781,069 | 11/1988 | Mitzner | 73/861.38 |
| 4,803,867 | 2/1989 | Dahlin | 73/861.38 |
| 4,811,606 | 3/1989 | Hasegawa et al. | 73/861.38 |
| 4,823,614 | 4/1989 | Dahlin | 73/861.38 |
| 4,860,594 | 8/1989 | Hammond et al. | 73/861.42 |
| 4,891,991 | 1/1990 | Mattar et al. | 73/861.38 |
| 4,895,030 | 1/1990 | Bergamini et al. | 73/861.38 |
| 4,895,031 | 1/1990 | Cage | 73/861.38 |
| 4,934,195 | 6/1990 | Hussain | 73/861.38 |
| 4,938,075 | 7/1990 | Lew | 73/861.38 |

FOREIGN PATENT DOCUMENTS

031734 5/1989 European Pat. Off. .
1008617 3/1983 U.S.S.R. .

Primary Examiner—Herbert Goldstein
Attorney, Agent, or Firm—Seidel, Gonda, Lavorgna & Monaco

[57] ABSTRACT

A Coriolis mass flow meter of the type including a continuous flexible flow tube fixedly mounted at its ends and adapted for receiving fluid flow. A driver oscillates the flow tube at a fixed frequency. A drive brace is attached at one end to the flow tube mount and at the opposite end to the flow tube substantially at the position of the applied oscillation of the driver. The brace limits the displacement of the flow tube transverse to the direction of the applied oscillation without substantially restricting the motion of the flow tube due to the Coriolis reaction of the fluid to the driver oscillation. The mounting of the flow tube being made by the engagement of gripping portions having bushings therein. The mount limiting transfer of forces acting on the inlet and outlet ends of the flow tube. Resonant pins are provided at each end of the flow tube adjacent the fixed mounting to resiliently clamp the flow tube and fix the resonant frequency thereof throughout its useful life. The Coriolis reaction of the fluid being measured by sensors so as to determine the mass flow rate of the fluid.

31 Claims, 8 Drawing Sheets

CORIOLIS MASS FLOW METER ADAPTED FOR LOW FLOW RATES

This is a continuation-in-part of application Ser. No. 07/249,805 filed Sep. 27, 1988 now abandoned.

BRIEF SUMMARY OF THE INVENTION

The present invention relates to an apparatus for measuring the mass flow rate and/or density flow rate of a fluid or slurry. Particularly the invention relates to a flow meter which operates on the Coriolis principle. The present invention has found application to the accurate measurement of the mass flow of a fluid having a low flow rate, such as in the range of 0.01 to 1 pounds per minute.

BACKGROUND OF THE INVENTION

Coriolis type mass flow meters operate on the principle that fluent material passing through a conduit tubing, when exposed to a deflection or oscillation transverse to the direction of flow, will react with a measurable force (the Coriolis force) on the walls of the tubing. The Coriolis reaction is generated by the material moving in an instantaneously changing curvilinear path, and acts with a force directly proportional to the momentum of the material in the tubing. The Coriolis reaction tends to apply a force in the opposite direction of the motion of the deflection of the flow tube on the inlet side thereof and with an equal and oppositely directed force on the outlet side thereof. The measurement of this reaction is used to determine the mass flow rate passing through the flow tube.

The flow tube portion of the Coriolis mass flow meter of the present invention is preferably formed in accordance with commonly assigned, co-pending application Ser. No. 912,893, filed Sep. 26, 1986. A Coriolis flow meter of this type includes a stabilized flow tube having a centralized center of gravity position substantially proximal the center of gravity of its mounting. This centralized mounting provides a stable oscillating structure which is less susceptible to sensor signal contamination, due to external noise or vibrational influences unrelated to the applied oscillation. A stable flow tube form permits more flexible tubing to be utilized, increasing sensitivity without increasing the detrimental effects on the Coriolis reaction measurement due to external mechanical noise and the like from the flow meter environment. Additionally, the present invention contemplates an oscillation applied to the flow tube at a frequency that is higher than the natural fundamental resonance of the flow tube. This applied oscillation produces a vibrational wave pattern along the flow tube length.

Increasing flexibility of the flow tube within a Coriolis mass flow meter increases the sensitivity of the meter to the Coriolis reaction, since the tubing will more readily react in response to the Coriolis force of the fluid. However, the detrimental effects of outside mechanical and vibrational noise on the Coriolis reaction measurement, is also typically increased by a more flexible flow tube. Further, the lateral stability (i.e. transverse to the direction of the applied oscillation) of the flow tube may also be detrimentally effected by increasing flexibility, introducing errors in the sensor signals as well as effecting the frequency of oscillation applied to the flow tube by the driver.

U.S. Pat. No. 4,711,132, issued Dec. 8, 1987, in FIGS. 11 and 12 shows stiffening portions on the flow tube which are intended to resist what is termed "wobble" and "roll" created by lengthening the projection of the flow tube from its mounting to increase flexibility. FIG. 11 shows stiffening plates which are attached to the sides of the projected flow tube to resist curvilinear bending, called "wobble", of these sides during application of the driver oscillation. FIG. 12 shows struts fixedly attached at both ends to two positions on the flow tube on the same side of the applied oscillation. These struts are intended to prevent displacement of the flow tube laterally, called "roll", with respect to the plane thereof. These struts and stiffening plates also limit the ability of the flow tube to flex in response to the Coriolis reaction of the fluid. These structures, therefore, are considered inapplicable to flow meters for measuring low flow rates, since sensitivity is an important feature within this flow range.

SUMMARY OF THE INVENTION

The present invention relates to a Coriolis mass flow meter comprising a continuous flow tube having an inlet and an outlet adapted to communicate with a define fluid stream or pipeline. The flow tube is oscillated by a driver transverse to the direction of flow therein. Sensors for measuring the translation, velocity or acceleration of the flow tube are typically positioned on opposite sides of the flow tube equidistantly from the driver. In the preferred embodiment of the present invention, the frequency of oscillation by the driver is substantially at a resonant frequency of the flow tube that is higher than the natural fundamental resonance thereof.

One portion of the present invention comprises a flexible brace attached at one end to a fixed base and at the opposite end to the flow tube, preferably, at the position of the applied oscillation of the driver. The brace is formed so as to limit the ability of the flow tube to displace laterally, i.e. transverse to the direction of the applied oscillation, without substantially restricting the motion of the flow tube due to the Coriolis reaction of the fluid. Further, the amplitude of oscillation is preferably limited solely by the damping factor of the flow tube and brace system. The brace stabilizes the frequency of oscillation by more precisely defining the frequency band width applied by the driver. The brace is tuned so that its resonance is closely related to that of the flow tube.

Another portion of the present invention comprises mounting the flow tube at its inlet and outlet ends by means of mating gripping portions within a mounting block. The gripping portions are adapted to engage the flow tube so as to limit the transfer of torque and other forces generated along the defined fluid stream or pipeline to the sensing portion of the flow tube. The gripping portions preferably include bushings made of a material that is substantially softer, i.e. more resilient, than the mounting block so as to maximize the grip. Additionally, the thermal coefficient of expansion of the bushings is preferably closer to that of the flow tube material than the mounting blocks.

A third feature contemplated by the present invention comprises resonant pins adapted to resiliently fix the resonant frequency of the unsupported length of the flow tube over its useful life. The resonant frequency of the flow tube operating at a harmonic frequency above the fundamental resonance must remain constant over the life of the flow meter so as to hold its calibration. The resonant pins fix the length of the tubing by engaging the flow tube with a resilient force within the elastic limits of the material that is clamping the flow tube or by a resilient spring force, thereby substantially eliminating the need for welding the tubing.

An additional feature of the invention includes resonant control weights positioned about the driver and sensors to tune the vibrational wave pattern of the unsupported tube segment to the pattern of the Coriolis reaction of the fluid on the flow tube. This tuning maximizes the signal to noise ratio of the oscillation pattern of the flow tube and significantly increases the measurability of the Coriolis reaction.

The features of the present invention are preferably contemplated for use within a single tube flow meter having sufficient flexibility to accurately determine the Coriolis reaction of a fluid flowing at a rate within the range of 0.01 to 1 pounds per minute. Such low flow rates require substantial measurement accuracy due to small reaction force acting on the flow tube. The features of invention may be used either alone or in combination as desired and are contemplated to be applicable to various flow meter structures beyond those presently described. Further features of the invention, including its applicability to meters for determining relatively greater flow rates, will become apparent by describing a preferred embodiments thereof.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

In the drawings where like numerals indicate like elements there is shown a Coriolis mass flow meter 10 including a continuous, flexible flow tube 12. The flow tube 12 is preferably formed in the manner described in commonly assigned, co-pending application Ser. No. 912,893, filed Sep. 26, 1986. This application is herein incorporated by reference. However, various other flow tube forms are applicable and contemplated for use with the features of the invention.

Figure 1:
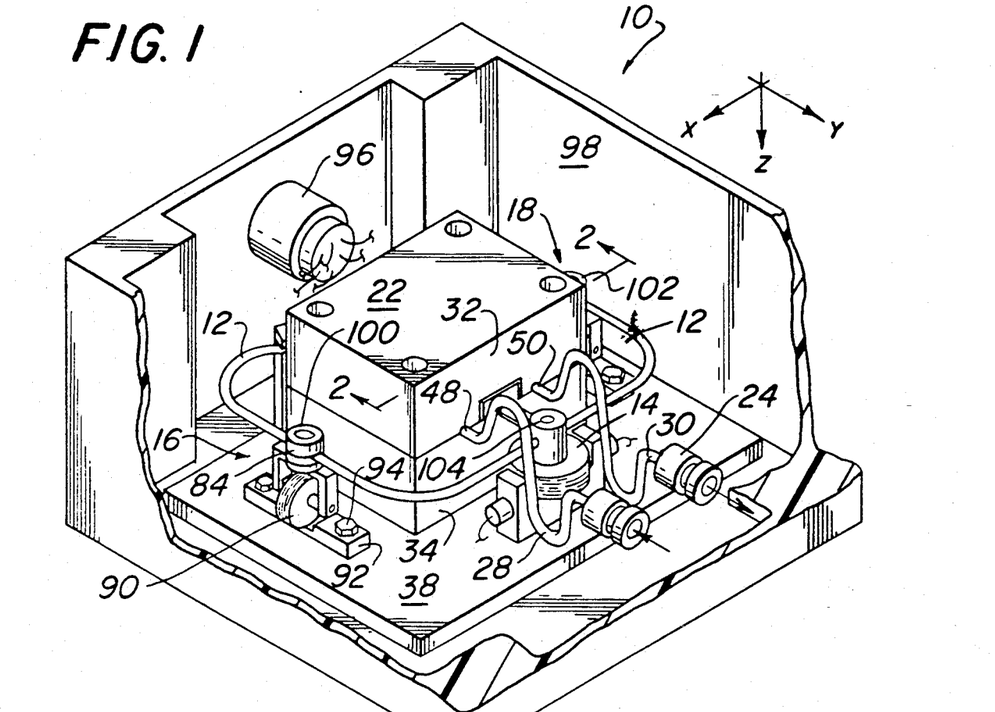
FIG. 1 shows a perspective view of a Coriolis mass flow meter as contemplated by the present invention.
Figure 2:
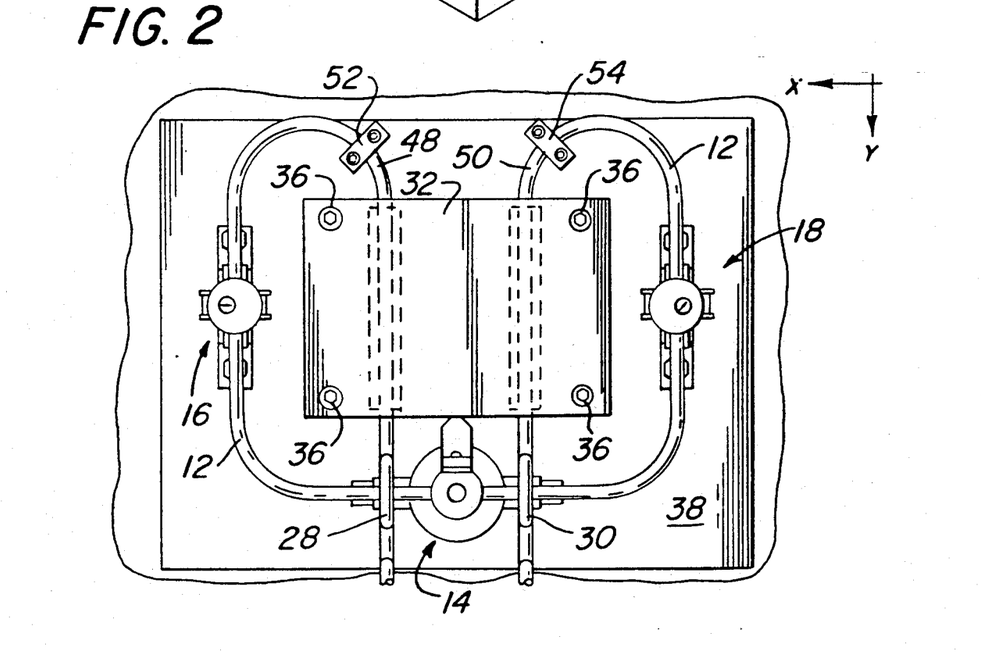
FIG. 2 shows a top plan view of the flow meter shown in FIG. 1.

As illustrated in FIGS. 1 and 2, the Coriolis mass flow meter 10 generally includes the flow tube 12, an electromagnetic drive 14 and sensors 16, 18. The driver, as illustrated, is positioned at the center of the flow tube length. The sensors 16, 18 are positioned on opposite sides of the driver 14, equidistantly therefrom. It should be noted, however, that the position of the driver and the position of the sensors may vary as desired depending on the shape of the flow tube, its frequency of oscillation, and its pattern of vibration.

Figure 3:
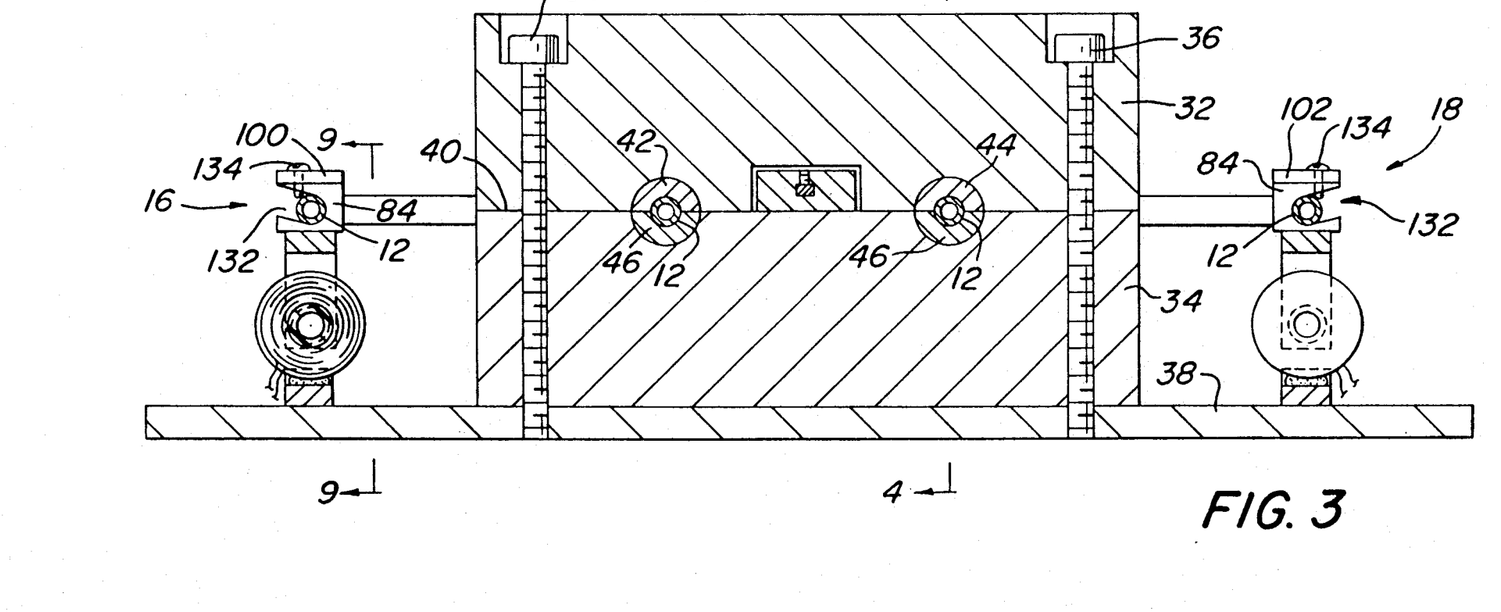
FIG. 3 shows a cross-sectional view thereof.
Figure 4:
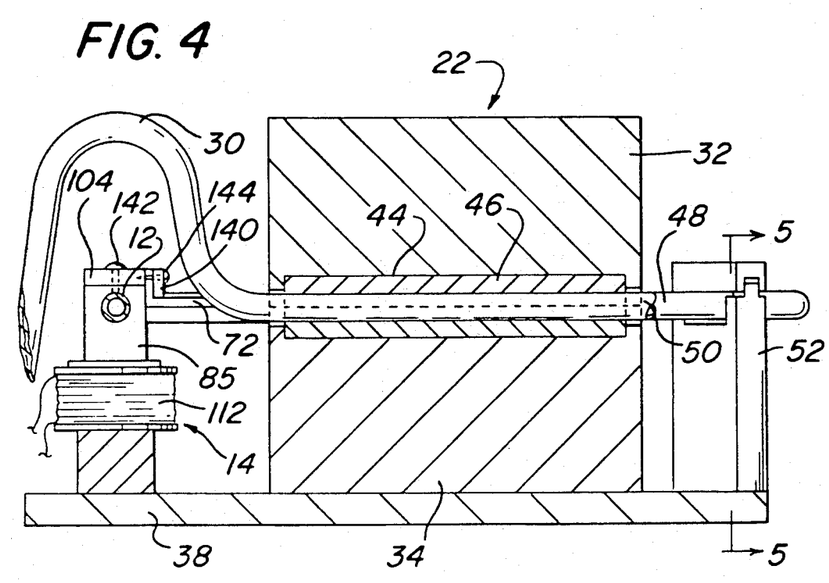
FIG. 4 shows a second cross-sectional view thereof.

The means for mounting the flow tube 12 effects the accuracy of the flow meter 10 in determining the mass flow. As illustrated in FIGS. 2, 3 and 4, the flow tube 12 is supported by mount 22. The flow tube 12 includes an inlet 24 and an outlet 26. The inlet 24 and outlet 26 are formed as flanges which are adapted to be connected to a pipeline or defined fluid stream. Extending from the inlet 24 to mount 22 is an inlet connecting section 28. There is also a corresponding outlet connecting section 30, formed substantially parallel to the inlet connecting section 28 and extends from the outlet 26 to mount 22. The inlet and outlet connecting sections 28, 30 are engaged by mount 22 so as to fix the position of the flow tube 12.

Mount 22 includes a upper portion 32 and a lower portion 34. The upper portion 32 is secured to the lower portion by means of bolts 36. Bolts 36 also secure mount 22 to a plate 38 which forms the base of the flow meter 10. Base plate 38 may be secured to any convenient surface when the flow meter 10 is positioned in its operating environment. Upper portion 32 and lower portion 34 form mating surfaces 40 passing substantially through the center of the mount 22. Mount 22 also includes gripping portions 42, 44 in the form of circular shape channels. Inlet and outlet connecting sections 28, 30 extend through the gripping portions 42, 44 and are engaged thereby to fix the position of the flow tube 12.

Provided within each gripping portion 42, 44 is a bushing 46. The outside diameter of the bushings 46 conforms to the inside diameter of the gripping portions 42, 44. The inside diameter of the bushings 46 conforms to the outside diameter of the inlet and outlet connecting sections 28, 30 of the flow tube 12. The bushings 46 may comprise mating upper and lower portions forming a substantially circular channel therethrough. It is contemplated for assembly and manufacturing purposes that the outside diameter of the bushings 46 will remain constant while the inside diameter may be varied over a range of flow tube diameters. The outside diameter of the bushings 46 is fixed so as to be firmly engaged by the gripping portions 42, 44. The engagement force is preferably constant at all anticipated operating temperatures for the flow meter 10. This engagement restricts transfer of forces generated at the inlet 24 or outlet 26 of the flow meter 10, such that these forces will not be transmitted through the connecting sections 28, 30 within mount 22 to the unsupported length of the flow tube 12.

Bushings 46 are preferably made of bronze or other soft material. Mount 22 is contemplated to be made of steel or the like. Thus, the bushings 46 are softer than portions 32 and 34 of the mount 22 to maximize the engagement force on the flow tube 12. In addition, bushings 46 preferably have a thermal coefficient of expansion closer to the flow tube 12 than that of the mount 22. Moreover, it is also contemplated that the engagement of the gripping portions will be provided over relatively long length as compared to the inside diameter of the bushings 46.

The sensing portion of the flow meter 10 includes the unsupported length of the flow tube 12 between the mounted ends 28, 30. This unsupported length, sometimes called the sensing portion, is that portion which may deflect in response to the applied oscillation of the driver 14. Thus, the inlet 48 to the sensing portion of the flow tube 12 is defined at the exit of the inlet connecting section 28 from bushing 46 within gripping portion 42. The outlet 50 of the sensing portion is defined by the passage of the flow tube 12 from bushing 46 within gripping portion 44.

The resonance of the sensing portion or unsupported length of the flow tube 12, particularly when oscillated in a higher than fundamental mode, must remain constant throughout the useful life of the flow meter 10 so as to hold calibration. This resonance is fixed by the resonant pins 52, 54 positioned adjacent the inlet 48 and the outlet 50. The structure of the resonant pins 52, 54 is particularly shown in FIGS. 5-8. It is contemplated that both pins 52 and 54 will be substantially identical. The following description relates specifically to pin 52, with pin 54 having the same structure.

Figures 5, 6:
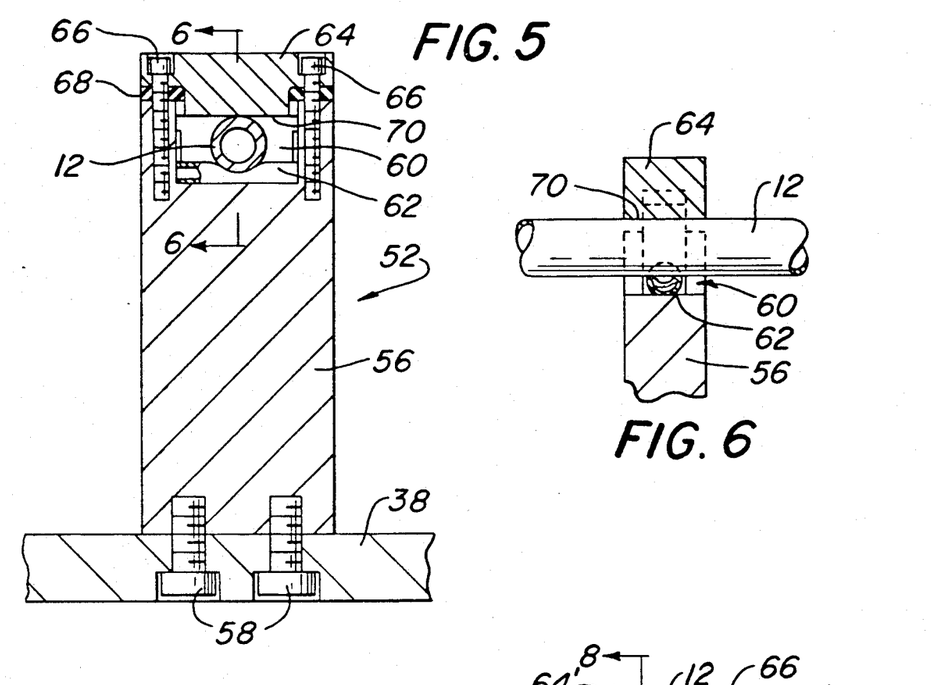
FIG. 5 shows a cross-sectional view of a portion of the invention.
FIG. 6 shows a second cross-sectional view of the portion of the invention shown in FIG. 5.

As particularly illustrated in FIGS. 5 and 6, resonant pin 52 includes a base 56 which is fixed to base plate 38 by bolts 58. Base 56 projects from the base plate 38 and terminates in a U-shaped end forming an opening 60. At the bottom of the opening 60 is positioned a support tube 62 preferably having a rounded upper surface. The support tube 62 is preferably made of a resilient or soft material, i.e. a material having a large range of elastic deformation such as aluminum. The flow tube 12 is position within the opening 60 and rests on the support tube 62. The flow tube 12 is fixed into position by means of block 64. Block 64 is mounted on the base 56 by means of bolts 66 which extend into the projections of the U-shaped end. Shims 68 may be provided between the block 64 and base 56 so as to fix the clamping force on the flow tube 12 between surface 70 of block 64 and the support tube 62.

The clamping force created by the surface 70 via bolts 66 preferably causes a slight crushing or deformation of the support tube 62 within the elastic limit of its material. Other known fixing techniques, such as welding, normally tend to change slightly with the age. The clamping force by pin 52 on the relatively stiff flow tube 12, as compared to the soft material of the support tube 62, is within the elastic deformation limits of the support tube 62 so as to assure flow tube 12 stability over its useful life.

Figure 7:
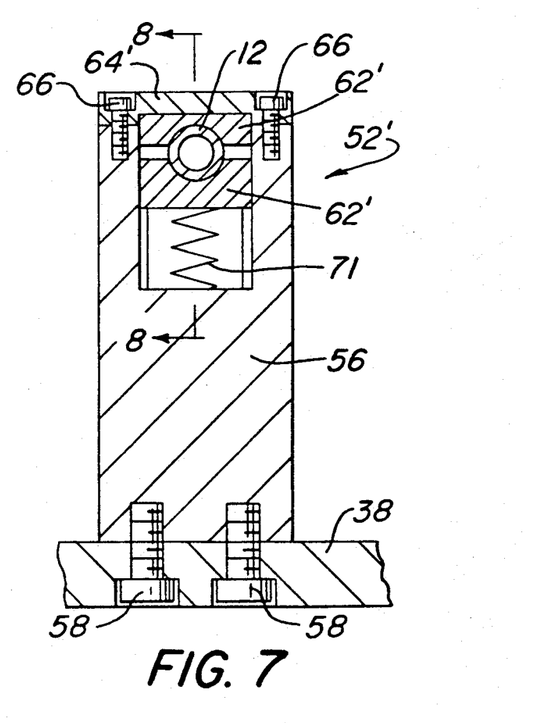
FIG. 7 shows a cross-sectional view of an alternate embodiment of that portion of the invention shown in FIGS. 5 and 6.
Figure 8:
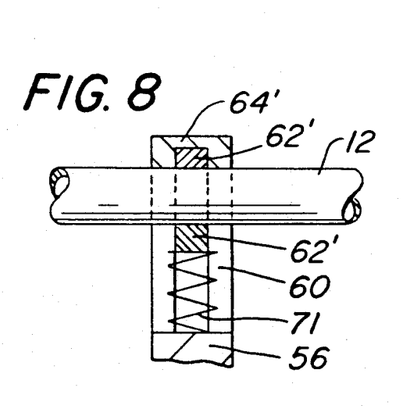
FIG. 8 shows a second cross-sectional view of the portion of the invention shown in FIG. 7.

An alternate embodiment of a resonant pin 52' is shown in FIGS. 7 and 8. This alternate embodiment includes base 56 connected to base plate 38 via bolts 58, similar to that formed in the embodiment shown in FIGS. 5 and 6. Within the opening 60 is positioned two clamping jaws 62' which are resiliently biased against the flow tube 12 by spring 71. The spring 71 may be any type, as desired, including a bellville or a coil type. Block 64 forms the top of the pin 52' and is rigidly attached to the base 56 via bolts 66, without requiring shims. Spring 71 provides sufficient clamping force to fix the flow tube 12 over the design temperature range of the flow meter 10. However, since the spring 71 provides a resilient bias against the flow tube 12, jaws 64' may be made of steel or other relatively rigid material. A groove is provided within jaws 64' to engage the flow tube 12 and maintain lateral as well as vertical stability of the tubing at this point.

Figure 16:
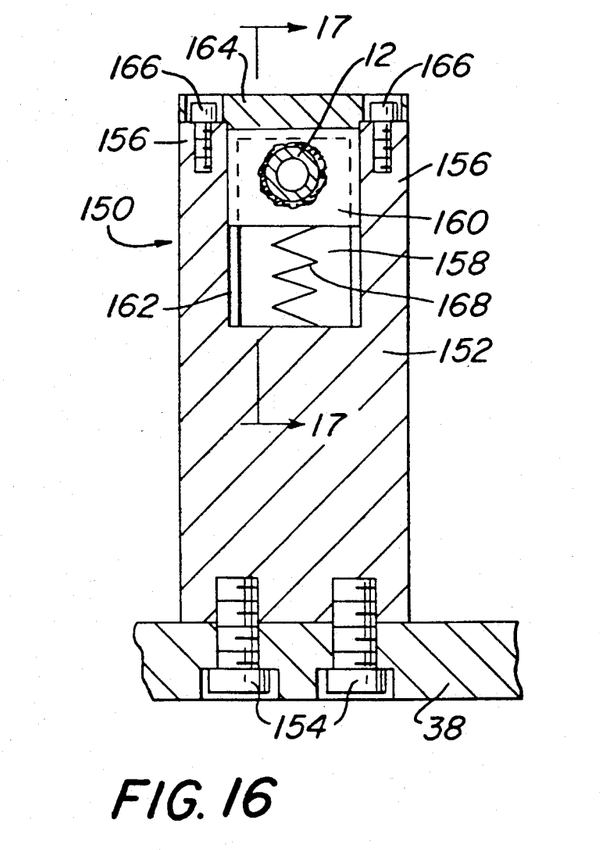
FIG. 16 shows a cross-sectional view of another alternate embodiment of the portion of the invention shown in FIGS. 5-8.
Figure 17:
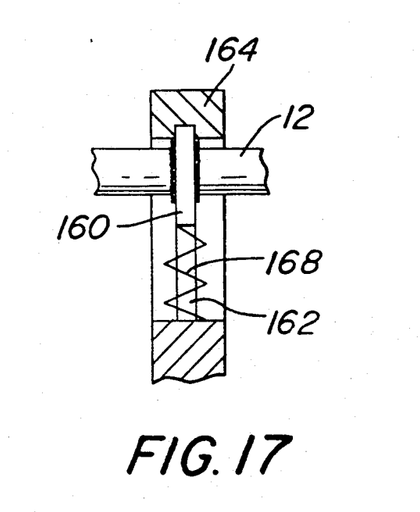
FIG. 17 shows a second cross-sectional view of the portion of the invention shown in FIG. 16.

Another alternate embodiment of a structure for fixing the ends of the flow tube 12 is shown in FIGS. 16 and 17. The fixing means in this embodiment is in the form of a resonant clamp 150. Clamp 150 includes a base 152 connected to base plate 38 via bolts 154. The base includes two upstanding projections 156 forming a gap 158. A flange 160 is attached to the flow tube 12 at the desired position by brazing or the like. Flange 160 is fixed within the gap 158 by engaging slot 162 on the inside surfaces of the projections 156. A clamping block 164 is attached to the top of projections 156 by screws 166. Base 152 and block 164 may also include slots for receiving the edge of the flange 160. A spring 168 is provided to fix the flange 160 within slot 162 to account for tolerance variations of the clamp structures. However, if the tolerances are closely machined, spring 168 need not be included. The resonant clamp 150 maintains the lateral and vertical stability of the ends of the flow tube 12 for fixing the resonant frequency of the unsupported flow tube length.

The flow tube 12 of the present invention, in that such is intended to handle small flow rates, is relatively small in diameter. In the embodiment shown here, the length of the unsupported portion of the flow tube 12, between pins 52 and 54, as compared to the cross-sectional area of the flow tube 12 creates flexibility. This flexibility increases the ability of the tubing to react in response to the Coriolis reaction of the fluid. However, a flexible flow tube 12 may tend to be unstable in the X-Y plane (FIG. 1) causing a transverse motion, i.e. a motion perpendicular to the direction of the applied oscillation by driver 14. This instability can be excited by fluctuation of the flow rate, by the influence of mechanical or other noise from the flow meter environment, or by the operation of the driver 14. This transverse movement within the X-Y plane affects the resultant vibrational frequency as seen by the flow tube 12 when oscillated by the driver 14. This resultant frequency may vary considerably due to lateral movement of the flow tube. Lateral displacement causes misalignment of the magnet within the coil 112 of the driver 14.

Figure 10:
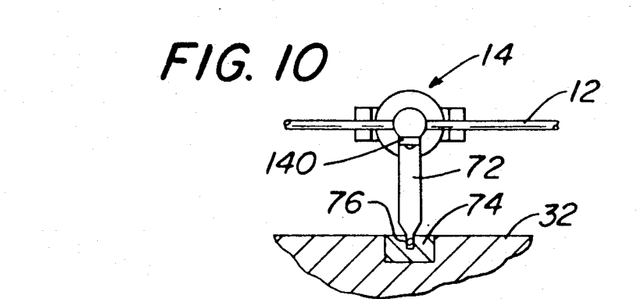
FIG. 10 shows a partial view of a further portion of the invention.
Figure 11:
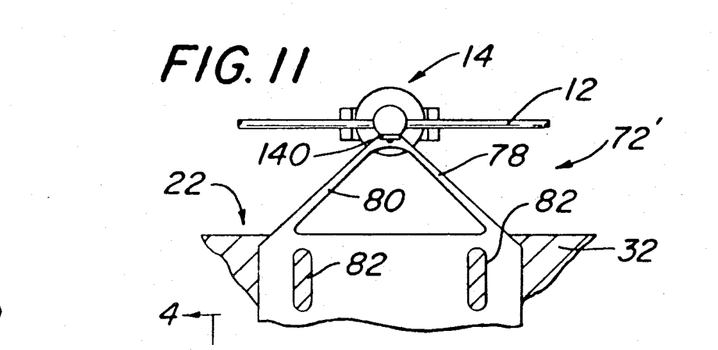
FIG. 11 shows a partial view of an alternate embodiment of the portion of the invention shown in FIG. 10.

As illustrated in FIGS. 2, 10 and 11 sensor 14 includes an attachment structure 85 that is fixed to the flow tube 12 by screw 142. Screw 142 is fixed in length so that its end does not crush the tubing. A drive brace 72 is also attached to the flow tube 12 at the position of the driver 14. Brace 72 is contemplated to be relatively thin and flexible and have a large dimension within the X-Y or lateral plane as compared to its other dimensions. Brace 72 is attached at its opposite end to the mount 22 at support block 74. Attachment to the mount 22 is made by means of a pin or small screw 76. The brace 72 includes a stepped portion directly adjacent its attachment to support block 74. The width of the brace 72 in this embodiment is approximately 0.1 inch, whereas the stepped or notched portion has a dimension of approximately 0.05 inch. The thickness of the material is contemplated to be approximately 0.01 inch.

The drive brace 72 is contemplated to be tuned to the resonant frequency of the unsupported flow tube segment. The brace 72 preferably has a resonant frequency close to that of the preferred operational frequency of oscillation of the flow tube 12 so as to offer little or no resistance to the applied oscillation of the driver 14 in the Z direction. However, the relative dimensions of the brace 72 are such that the damping factor within the X-Y or lateral plane is higher as compared to that in the Z direction. This dimensional relationship stabilizes the flow tube 12 in the X-Y plane and has the effect of substantially narrowing the band width of the resultant oscillation frequency applied by driver 14. Thus, the brace 72 assists in maintaining the oscillation of the driver 14 at the desired frequency. Furthermore, the relative flexibility of the brace 72 in the Z direction will not substantially effect the measurable Coriolis reaction on the flow tube 12.

FIG. 11 shows an alternate embodiment of a bracing structure 72'. In this embodiment, two brace arms 78, 80 form an A-frame with respect to the mount 22. The apex of the A-frame is attached to the flow tube 12 at driver 14. The opposite ends of the brace arms 78, 80 are attached to portion 32 of mount 22 at openings 82 on the base of brace 72'. The opening provided within the center of the A-frame of brace 72' includes radiused corners. The brace 72' should be relatively stiff with respect to the unsupported segment of the flow tube 12, having a thickness in the range of 0.006 to 0.010 inch. Further, the brace arms 78, 80 are tapered away from mount 22. The brace 72' is contemplated to be made of a stainless steel, such as a spring stock material SST304, which has been tempered to one half hard. The material may be formed by a photoresistive etching process from a shim stock. If formed in this manner, it is preferred that the grains of the shim stock due to the forging and rolling processes be aligned generally in the direction of the apex of the A-frame. This alignment will provide both arms 78, 80 of brace 72' with substantially the same flexibility.

The brace structures 72 and 72', as shown in FIGS. 10 and 11, are attached to the structure of the driver 14 by means of plate 140. The end of the brace 72 or 72' is folded upwardly and is engaged by plate 140. (See FIG. 4.) Plate 140 is secured to the driver 14 by screw 144 which projects through plate 140 and the end of the brace 72 or 72'. As illustrated, screw 144 is engaged within resonant control weight 104. A pin type structure may also be used as a substitute for the screw 144. Other means of securing the end of the brace 72 or 72' to the driver 14 are also contemplated.

Figures 12, 15:
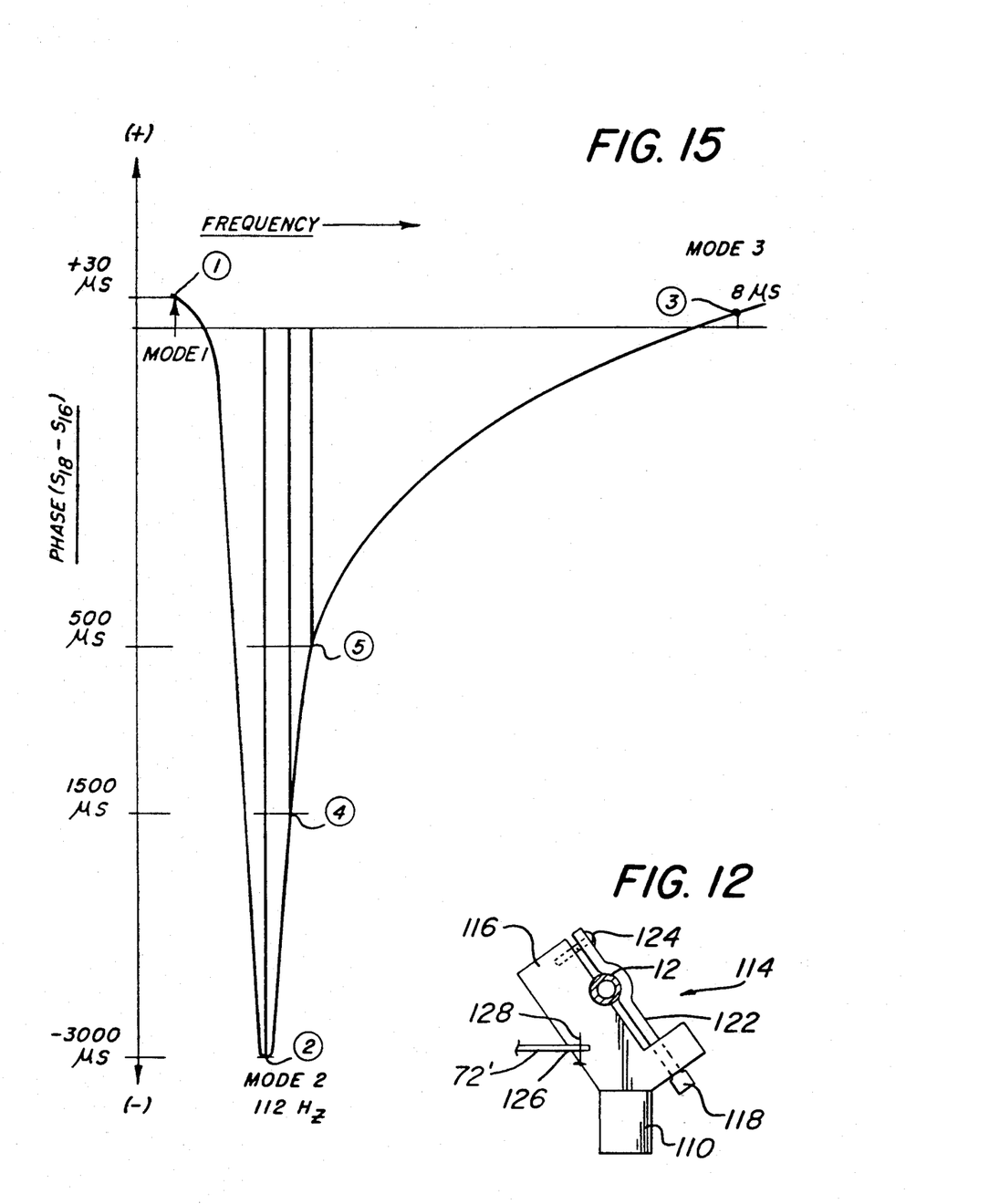
FIG. 12 shows a variation of the embodiment of the portion of the invention shown in FIG. 11.
FIG. 15 is a graph (not to scale) of the phase shift of opposite sides of the flow tube of the present invention as a function of the frequency of the applied oscillation.

FIG. 12 shows an alternate embodiment of a means for securing the bracing structure 72 or 72' to the flow tube 12 as well as for forming the driver 14. The securing means 114 includes a base portion 116, having a substantially "L" shape, and a clamp 122. The projection of the base portion 116 includes an opening 118 for insertion of a tab 120 on clamp 122. Tab 120 is inserted into slot 118. The opposite end of clamp 122 is fixed to the base 116 by screw 124. The base portion 116 and clamp 122 form a grove which conforms to the flow tube 12 diameter. The driver magnet 110 is mounted on the lower end of the base 116 so as to project substantially vertically downward when the securing means 114 is mounted on the flow tube 12.

A slot 126 is provided on the lower surface of the base 116 for receipt of the brace 72 or 72'. An enlargement of the attachment end of brace 72 or the apex of brace 72' will provide a large surface area for securing the brace within slot 126. Tee brace 72 or 72' may be secured within slot 126 by a high temperature epoxy. It is contemplated that this joint will experience a significant shear stress during operation due to the internal pressure within the flow tube 12. This internal pressure, because of the shape of the flow tube, will tend to force the straight crossing portion (at the driver) outwardly in the Y direction (as shown in FIGS. 1 and 2). A pin 128 may be inserted therein for further securing the brace 72 or 72' to the clamping means 114. The brace 72 or 72' may also be braised or otherwise fixed within the slot 126.

The engagement of the clamping means 114 on the flow tube 12 in this manner is contemplated to be capable of maintaining the magnet 110 in a fixed position over the life of the flow meter 10 without substantially effecting the drive frequency. Variations in the A-frame structure as well as other bracing structures may be contemplated for use along with the present invention. These variations will likely be dependent upon the size of the tubing and the overall frequency of oscillation during operation.

Figure 9:
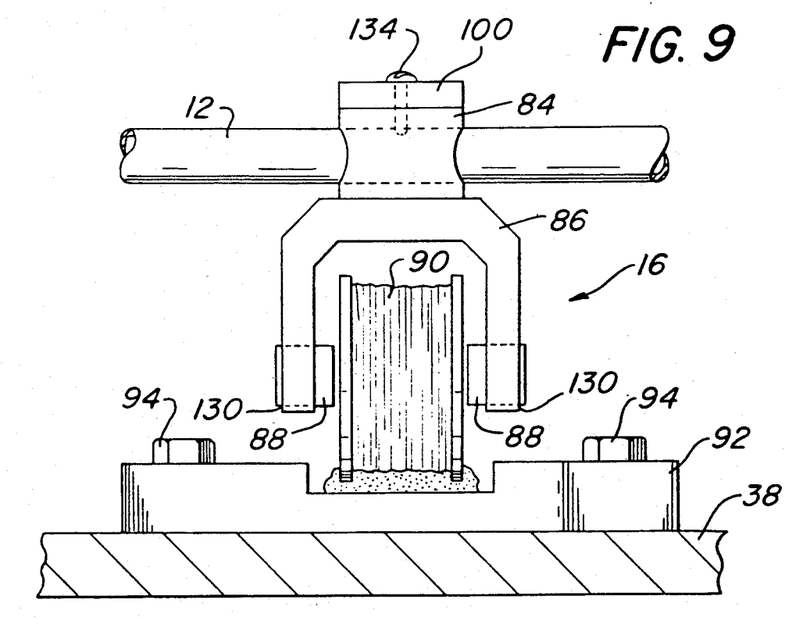
FIG. 9 shows another portion of the present invention.

FIG. 9 illustrates a sensor structure for use with the present invention. Sensors 16 and 18 positioned on opposite sides of the flow meter 10 are contemplated to have the same or similar structure. The sensors 16, 18 are limited only in that, preferably, a relatively small mass should be mounted on the flow tube 12. Sensor 16 includes an attachment structure 84 and a U-shaped bracket 86 which supports magnets 88 adjacent opposite sides of a coil 90. Magnets 88 may be mounted on the bracket 86 within openings 130 at the projected ends. The positioning of magnets 88 within the opening 130 may be further supported by a high temperature epoxy. Other suitable means is contemplated such as by directly mounting the magnets 88 on the inside surface of the bracket 86 by means of an epoxy. Other means for mounting, as well as other sensor structures, should be apparent to those skilled in the art.

Attachment means 84 fixes the position of the sensor 16 on the flow tube 12 by insertion in a notch 132. A screw 134 projects downwardly through the mounting means 84 to engage the flow tube within the notch 132. The sensor 16 may also be supported on the flow tube 12 by including an opening which substantially conforms to the outside diameter of the flow tube. The attachment structure 84 can then be slid onto the ends of the flow tube 12 to the proper position. The sensor 16 may then be secured onto the flow tube 12 at that position by means of screw 134, by braising or the like. Movement of the magnets 88 induce a current within the coil 90 sending a sensor signal. The coil 90 may be fixed to a support 92 attached to the base plate 38 via bolts 94.

The sensing portion of the flow meter 10 includes the unsupported length of the flow tube 12, the sensors 16, 18, the driver 14 and the drive brace 72 or 72'. The resonant frequency of the sensing portion of the flow meter 10 for a given flow tube 12 can be varied by controlling the mass suspended on the flow tube 12 and the stiffness of the brace 72 or 72'. The resultant resonant frequency of this flow meter sensing portion is a complex combination of these elements.

The attachment structure 85 of the sensors 16, 18 includes resonance control weights 100 and 102. Weight 104 is also included on the flow tube 12 about the driver 14. Control of the mass of the sensors 16, 18 and the driver 14 by these weights 100, 102, 104 optimize the signal to noise ratio of the sensing portion of the flow tube 12. Further, by controlling the mass of the sensors 16, 18, the overall oscillation pattern of the sensing portion of the flow meter 10 may be tuned to the pattern of the Coriolis reaction of the fluid. This tuning results in an increase in the amplitude of the Coriolis reaction and, thus, increases the measurability of that reaction. Tuning is accomplished by the addition or deletion to these weights 100, 102, 104. Weight 100, as shown in FIG. 9, is mounted on the attachment structure 85 of the driver 14 and is adapted to control the mass of the vibrating element of the flow meter and set the oscillating frequency thereof. Weights 100, 102 are positioned about the sensors 16, 18, respectively, to tune the segment of the unsupported flow tube length adjacent thereto. Once the desired position of the sensors 16, 18, and the other aspects of the mass flow meter operation have been determined, the sensor and driver structure may be fixed. Therefore, further adjustment is not necessarily required upon tuning the relative structures of the flow meter.

A number of embodiments are contemplated for the present invention. Specifically, the size and bore of the flow tube meter may vary dependent upon the desires of the user. The following examples are for purposes of representing the relative adjustment of the flow meter structures to tune the operation of the flow meter. Each embodiment contemplates an unsupported flow tube length of approximately 9.85 inches (as measured along the centerline of the tubing). The flow tube material is further contemplated to be made of a stainless steel material (SST 316L). A first embodiment includes tubing having an outside diameter of 0.062 inch and a wall thickness of 0.008 inch. The sensors 16 and 18 in this embodiment each have a total mass of 1 gram ($\pm 0.1$ grams). This embodiment further includes the A-frame-type bracing structure 72' as described above. The thickness of the brace arms 78, 80 is approximately 0.008 inch. This structure provides a second resonance at approximately 114 Hz. A second embodiment includes tubing having an outside diameter of 0.093 inch with a 0.008 inch wall thickness. The sensors have a mass of approximately 1.75 grams. The brace is approximately 0.006 inch thick. This structure provides a second resonance at approximately 126 Hz. A third embodiment has a tube diameter of 0.042 inch with a 0.008 wall thickness. The mass of the sensors is approximately 0.4 gram. The thickness of the brace is approximately 0.010 inch. The second resonant frequency of this structure is approximately 113 Hz.

Figures 13A, 13B, 13C, 13D:
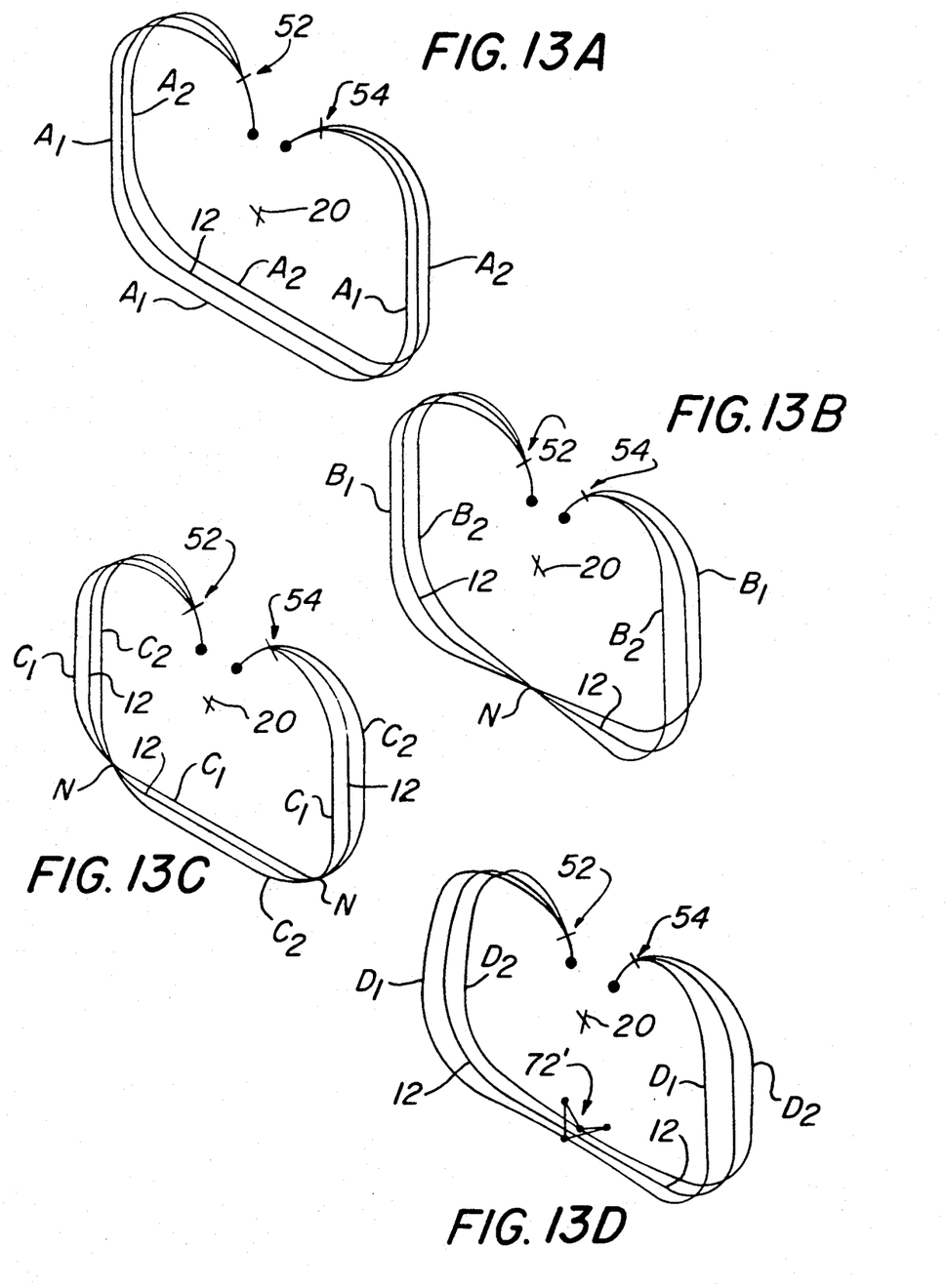
FIGS. 13A, 13B, 13C and 13D show various vibrational wave patterns of a flow tube oscillated at various resonant frequencies.

In FIGS. 13A-D there is shown various vibrational oscillation patterns of the flow tube 12 shown in FIGS. 1 and 2. FIGS. 14A-D makes reference to the oscillation patterns shown in FIGS. 13A-D, respectively. FIG. 14 is a representation of the linear deflection along the length of the flow tube due to the oscillation of the driver 14. This FIG. 14 further represents the Coriolis reaction gradient corresponding to the vibrational pattern shown. It should be noted that the Coriolis reaction as well as the amplitude of the oscillation is constantly changing. FIGS. 14 A-D show peak deflection and reaction during one half cycle of oscillation. Thus, the proportional relationship of these reactions to the deflection is represented. In FIGS. 13A, 13B, and 13C at that particular time the brace 72 or 72' has not been included as part of the sensing portion.

Figure 14A:
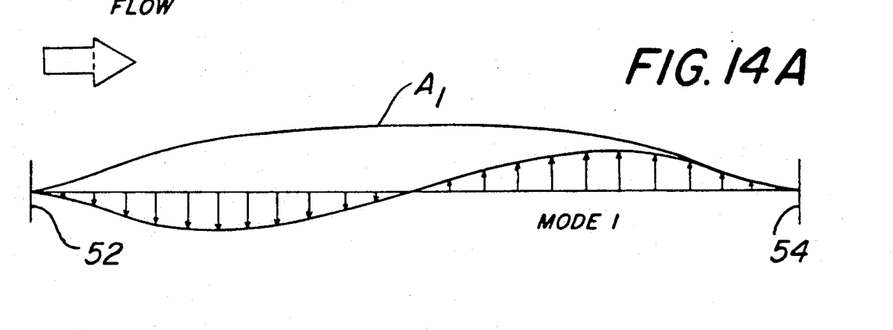
FIGS. 14A, 14B, 14C and 14D are illustrations of the vibrational wave patterns show in FIGS. 13A-D, respectively, including a representation of the Coriolis reaction produced therefrom.

In FIG. 13A and FIG. 14A there is shown a flow tube oscillated at the fundamental resonant frequency of the tubing between resonant pins 52, 54. In FIG. 13A the maximum deflection of the flow tube 12 on opposite sides of the neutral plan are labeled $A_1$ and $A_2$. In FIG. 14A only the deflection in the $A_1$ direction is shown. As can be seen in FIG. 14A, the Coriolis reaction is in the form of a gradient and is dependent upon the relative rotation of the flow. With the flow moving from left to right across the page, the Coriolis reaction at the inlet end of the flow tube 12 is in a direction opposite of the deflection by the driver 14. This reaction reaches a maximum substantially at a position between the inlet and the maximum deflection or center position of the flow tube 12. This maximum reaction is a maximum rotation or change in direction of the flow due to the deflection of the flow tube 12 by the driver. A similar reaction is found on the opposite side of the center of the flow tube 12. This opposite side reaction is generally in the same direction as the vibrational deflection $A_1$. This type reaction pattern at the fundamental resonance or mode 1 is generally referred to as lagging the deflection of the flow table by the driver on the inlet side and leading on the outlet side. By positioning sensors on opposite sides of the maximum deflection, the effect of the Coriolis reaction on opposite sides of the driver is determined. This reaction is proportional to the mass flow.

Figure 14B:
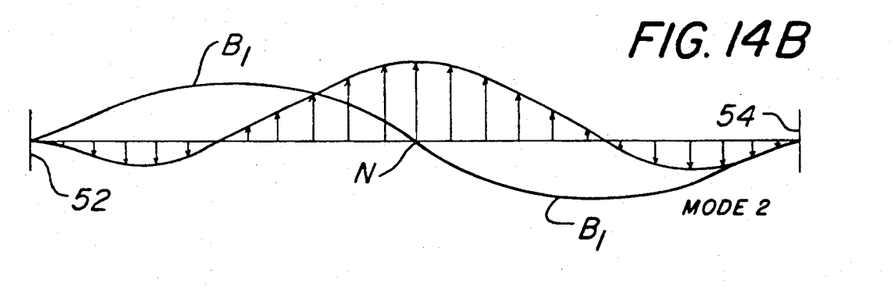

FIGS. 13B and 14B are generally representative of a flow tube oscillated in the second mode or at the second resonant vibrational frequency. The vibrational pattern represented by $B_1$ and $B_2$ includes a node N at the center of the flow tube length. A node is generally defined as a local minimum amplitude of vibrational about which the flow tube length appears to flex. A node is comparable to a free floating ball and socket joint with the flow tube forming flexible extensions from both sides of the socket. Advantages obtained by a nodal type vibrational pattern are generally described in commonly assigned co-pending application Ser. No. 912,893, filed Sep. 26, 1986. FIG. 14B also represents the reaction gradient of the fluid in response to this vibrational pattern. A maximum reaction is created substantially at the node N. This maximum is the result of the fluid experiencing a maximum change in angular direction at that position. The fluid is being rotated at the greatest rate at node N. The translational motion of the remaining portions of the flow tube diminishes the relative rotation of these portions as compared to the node N. The vibrational patterns $B_1$ also includes two local maximum amplitudes of vibration on opposite sides of the node N.

Figure 14C:
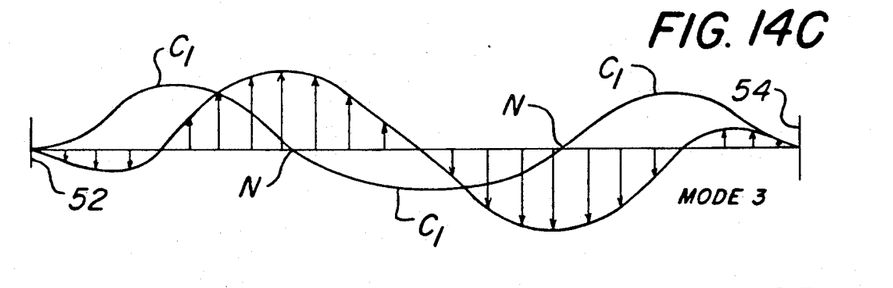

FIGS. 13C and 14C generally show a flow tube oscillated in the third mode or at the third resonant vibrational frequency. The vibrational pattern $C_1$ and $C_2$ includes two nodes N located symmetrically on opposite sides of the flow tube. The two nodes N isolate the oscillation of the flow tube from its fixed ends at the resonant pins 52 and 54. The nodes N are relatively free floating points in space which are not substantially effected by vibrational influences and external noise. As can be seen, the Coriolis reaction pattern includes two local maximums due to the rotation of the flow at the nodes N. Preferably, the sensing of the Coriolis reaction in this embodiment is made adjacent the local maximum amplitudes of vibration. These vibrational maximums are located on opposite sides of the flow tube, between a fixed end and a node.

In each of the vibrational and reaction patterns shown in FIGS. 13A-C and FIGS. 14A-C, respectively, the mode of the oscillation of the flow tube is out of phase with respect to the "mode" of the Coriolis reaction. As shown in FIG. 14A, the mode 1 vibrational pattern $A_1$ includes what can be labeled as a "mode 2" reaction pattern. In FIG. 14B, the mode 2 vibrational pattern $B_1$ includes a "mode 3" reaction pattern. In FIG. 14C, the mode 3 vibrational pattern $C_1$ includes a "mode 4" reaction pattern. Additional modes of vibration would include similar reaction pattern relationships.

The present invention contemplates the tuning of the vibrational pattern of the flow tube to that of the Coriolis reaction pattern. This tuning of the flow tube 12 is a function of the resonant weights 100, 102 and 104 and the brace 72 or 72'. In the preferred embodiment of the present invention, the brace 72 or 72' is a spring preferably having a spring coefficient that is stiffer or greater than that of the unsupported length of the flow tube. The brace in this respect serves to limit the amplitude of deflection of the flow tube at its central position. The weight of the sensors 16 and 18 on opposite sides of the driver, when set at the desired mass, accentuate the deflection of the flow tube between the driver and the fixed ends. Thus, the flow tube on opposite sides of the driver translates a greater distance from the neutral position than at the driver which is limited by the brace.

Figure 14D:
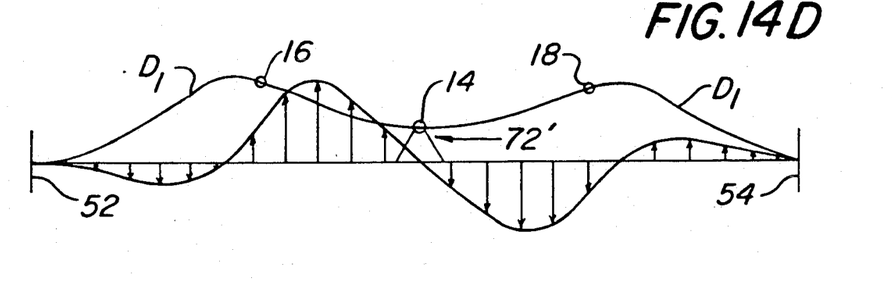

As shown in FIGS. 13D and 14D, the vibrational $D_1$ pattern $D_1$ includes two local maximum amplitudes of vibration. These local maximums are positioned on opposite sides of the center position of the flow tube 12 and are moving in the same direction. The flow tube at these local maximums are also moving in the same direction as the driver. The pattern of the Coriolis reaction substantially coincides with this vibrational pattern such that the reaction is in resonance with the oscillation.

As can be seen in FIG. 15, the frequency of the applied oscillation of the driver also substantially effects the vibrational and reaction patterns shown in FIGS. 13D and 14D. The curve shown in FIG. 15 is a plot of the relative phase difference between sensor 16 and sensor 18 as a function of the driver frequency. Point 1 on the graph generally represents the phase difference at a drive frequency which is substantially the fundamental resonant frequency of the sensing portion of the flow meter. The phase difference created by the Coriolis reaction of the fluid for example 1 above is in the range of 30 microseconds. (This value is determined by the phase of sensor 18 on the outlet end of the flow tube less the phase of the signal generated by sensor 16 on the inlet side of the flow tube.) Point 2 on the graph illustrates the phase difference produced by the present invention when oscillated at a mode 2 equivalent frequency for the flow tube. This mode 2 frequency generally produces a reaction in the range of −3000 microseconds. (The negative value for this phase difference is due to the equation, whereby the signal from sensor 16 is subtracted from the signal from sensor 18.) Point 3 on the graph generally represents the phase difference, 8 microseconds, at a mode 3 drive frequency.

The substantial increase in the measurable phase difference is a result of the tuning of the flow meter to create the vibrational pattern illustrated in FIGS. 13D and 14D. The tuning of the flow meter includes either adjustment of the mass of the sensors and driver for a given flow tube or adjustment of the stiffness of the brace. The resonant weights 100, 102 on the sensors control the "resonant" frequency of the portion of the flow tube between the fixed inlet end and the position of the driver and the second portion of the flow tube between the driver and the fixed outlet end. These adjustments are made to tune the resonant frequencies of these flow tube portions to be approximately half of that of the flow tube. The amplitude of oscillation of the flow tube at the driver is essentially fixed by the operation of the driver and the spring force of the entire flow tube and the brace. However, in the embodiments discussed above, by driving the flow tube at the mode 2 frequency, the second resonance of the sensing portion of the flow meter substantially corresponds to the mode frequency of each half of the flow tube. Thus, the flow tube becomes compliant to the resonance of the flow tube portions greatly amplifying the vibration of the flow tube on opposite sides of the driver. The resultant vibrational pattern also falls into resonance with the reaction pattern of the Coriolis response. This resonance permits the Coriolis reaction to act on the flow tube without conflicting with the vibrational pattern of the flow tube. Thus, limiting the ability of the Coriolis reaction to deflect the flow tube.

If the sensing portion of the flow meter, including brace 72 or 72', is oscillated at around the fundamental resonance of the flow tube, the Coriolis reaction is not tuned to the vibrational pattern. This is due to the fact that the mode 1 resonance of the two half portions of the flow meter length is not reached. The reaction pattern of the Coriolis response would be substantially the same as that illustrated in FIGS. 13A and 14A with the vibrational pattern dominating. Further, if the flow tube is oscillated at around its mode 3 frequency, the vibrational pattern illustrated in FIGS. 13C and 14C would substantially be created. Again, the opposite portions of the flow tube are out of resonance with the drive frequency and the vibrational pattern dominates over the Coriolis reaction pattern.

As can be seen, the vibrational pattern $D_1$ shown in FIG. 14D is similar to the vibrational pattern $C_1$ shown in FIG. 14C. Each pattern includes two local maximum amplitudes of vibration moving in the same direction on opposite sides of the center position of the flow tube Further, the Coriolis reaction patterns are for each example includes a "mode 4" type reaction pattern. However, the tuning of the reaction pattern to the vibrational pattern of the flow tube in FIG. 14D substantially increases the measurability of the Coriolis reaction as compared to that shown in FIG. 14C. This is due to the fact that the reaction maximums in FIG. 14C are dominated by the vibrational pattern $C_1$. In FIG. 14D the Coriolis reactions are substantially coincident with the vibrational maximums. This "resonance" of the vibrational and reaction pattern substantially increases the measurability of the Coriolis reaction. This tuning of the reaction and vibrational pattern substantially contributes to the determination of the mass flow rate for the low flow rates, as contemplated by the present invention.

Points 4 and 5 on the graph shown in FIG. 15 generally illustrate the further tuning of the flow meter by means of the resonant weights 100, 102 and 104 on the sensors 16 and 18 and driver 14, respectively, and the stiffness of the brace 72 or 72'. If the flow tube 12 were permitted to oscillate exactly at its mode 2 resonant frequency, the vibrational pattern is unstable. Minute changes in the frequency of oscillation will greatly effect the phase shift for reasons other than the Coriolis reaction. This is represented by the large peak reaction at the mode 2 frequency, point 2. By adjusting the mass of the resonant weights 100, 102 and 104, the flow meter 10 may be tuned slightly out of resonance to provide a more stable oscillation. The decrease in the phase difference from point 2 to points 4 or 5 is not considered significant in view of the relatively large value therefore and the resultant stability of the phase of the sensor signals produced.

Tuning of the flow meter may also be accomplished by adjusting the relative stiffness of the spring once the mass of the resonant control weights has been determined. For example, if the driver frequency is operating below the flow tube resonance, the dimensions of the brace may be increased to stiffen the spring force as compared to the prior operating structure. Likewise, if the driver frequency is operating above the flow tube resonance, the spring force of the brace may be relaxed, by decreasing the dimensions or changing the materials. This change in the overall vibrational frequency of the sensing portion of the flow meter does not substantially effect the resonance of the opposite sides of the flow tube. This is due to the fact that the resonance of the local maximum amplitudes of vibration are not dependent upon the spring force of the brace. Rather, this resonance is dependent upon the length of the tubing between the fixed ends and the center position and the mass of the sensors. It should be noted that the vibrational and reaction pattern shown in FIGS. 13D and 14D may be produced by other structured and such are contemplated. For example, in relatively heavier tubing capable of handling greater flow rates, two drivers may be utilized to produce the desired reaction pattern. These drivers would be positioned on opposite sides of the center of the flow tube length. However, the brace structure would also be included at the center position. The brace structure in this embodiment is contemplated to provide a substantial restriction to the ability of the flow tube to oscillate at the center position. The drivers would create local maximum amplitudes of vibration similar to those illustrated in FIGS. 13D and 14D. The brace would act as a restriction to the amplitude of vibration. Other embodiments of a flow meter in accordance with the teachings of the present invention may become apparent to those skilled in the art after reviewing the above disclosure.

The electronics of the flow meter 10 including wires communicating with the driver 14 or the sensors 16, 18, may be attached to an electrical connector 96 supported on cover 98 which surrounds the flow meter 10. Processing of the signals from the sensors 16, 18 to determine the mass flow rate and to control of the driver frequency can be made in any manner as desired or as known in the art. One contemplated method of determining the mass flow rate from the signals generated by the sensors is described in U.S. Pat. No. 4,782,711.

The flow meter 10 of the present invention is intended to handle small flow rates between 0.01 to 1 pounds per minute. The background mechanical noise is isolated in part from sensing portion of the flow tube 12 by means of mounting block 22. Various flow tube materials, such as stainless steel, Hastelloy (registered trademark), monnel, titanium, etc., can be used as part of the present invention without the need to develop corresponding welding and or brazing techniques for fixing the ends of the tubing. However, other methods of fixing the ends of the flow tube 12 may be utilized. The gripping portions 42, 44 of the mount 22 may be adapted to handle various diameters and/or configurations of the flow tube by modifying the dimensions of the bushings 46. Thus, a range of applications can be fit into a standard mounting block 22 making manufacturing more cost effective. Additionally, a faulty, plugged or eroded flow tube may be economically repaired and/or replaced, even within the field, without requiring replacement of the entire flow meter.

The present invention may be embodied in other specific forms without departing from the spirit or essential attributes thereof and, accordingly, reference should be made to the appended claims, rather than to the foregoing specifications, as indicating the scope of the invention.

I claim:

1. A Coriolis mass flow meter comprising: a continuous flow tube adapted to receive and exhaust fluid flow; a base, the flow tube fixedly mounted at its ends to the base; a driver adapted to oscillate the flow tube at a resonant frequency thereof; sensors positioned on opposite sides of the flow tube equidistantly from the driver; and brace means attached at one end to the base and at the opposite end to the flow tube, the brace means attached to the flow tube at substantially the same position as the driver and adapted to limit lateral displacement of the flow tube transverse to the direction of the applied oscillation without substantially restricting the Coriolis reaction of the fluid on the flow tube in response to the applied oscillation of the driver.

2. A Coriolis mass flow meter as claimed in claim 1 wherein the brace means is attached to the flow tube at the center of the flow tube length between the fixed ends.

3. A Coriolis mass flow meter as claimed in claim 1 wherein the driver is adapted to oscillate the flow tube at a resonant frequency of the flow tube higher than the fundamental resonant frequency thereof, the oscillation applied by the driver creating local maximum amplitudes of vibration along the flow tube length, the sensors positioned adjacent the local maximum amplitudes of vibration.

4. A Coriolis mass flow meter as claimed in claim 3 further comprising means on the flow tube for varying the mass of the flow tube between opposite ends and for producing a vibrational pattern along the length of the flow tube created by the applied oscillation of the driver that is coincident and substantially in resonance with the Coriolis reaction of the fluid in response to the oscillation of the flow tube.

5. A Coriolis mass flow as claimed in claim 3 wherein the frequency of oscillation applied by the driver is substantially at the second resonant frequency of the flow tube.

6. A Coriolis mass flow meter as claimed in claim 1 further comprising means positioned at each end of the flow tube adjacent the fixed mounting thereof adapted to resiliently clamp the flow tube adjacent the ends thereof to define the resonant frequency of the unsupported length.

7. A Coriolis mass flow meter comprising: a continuous flexible flow tube adapted to receive and exhaust fluid flow; a base, the flow tube fixedly mounted to the base; a driver adapted to oscillate the flow tube transverse to the direction of flow therein; sensors positioned on opposite sides of the flow tube and adapted to output a signal proportional to the motion of the flow tube in response to the driver oscillation; and brace means attached at one end to the base and at the opposite end to the flow tube, the brace means limiting lateral displacement of the flow tube transverse to the direction of the applied oscillation without substantially restricting the Coriolis reaction of the fluid on the flow tube in response to the applied oscillation of the driver, the brace means having a first portion and a second portion, the first and second portions generally forming an A-frame with the apex of the frame attached to the flow tube and the opposite ends of the first and second portions attached to the base.

8. A Coriolis mass flow meter comprising: a continuous flexible flow tube adapted to receive and exhaust fluid flow; a base, the flow tube fixedly mounted at its ends to the base; the base having mounting means including a first portion and a second portion, the first and second portions having mating surfaces including gripping portions therein, the gripping portions adapted to engage the inlet and outlet ends of the flow tube over a substantially large surface area as compared to the cross-sectional area of the flow tube; a driver adapted to oscillate the flow tube transverse to the direction of flow therein; sensors positioned on opposite sides of the flow tube equidistantly from the driver; and brace means attached at one end to the base and at the opposite end to the flow tube, the brace means adapted to limit lateral displacement of the flow tube transverse to the direction of the applied oscillation without substantially restricting the Coriolis reaction of the fluid on the flow tube in response to the applied oscillation by the driver.

9. A Coriolis mass flow meter as claimed in claim 8 wherein the mounting means further comprises bushing means provided within the gripping portions, the outside dimensions of the bushing means engaged by the first and second portions and the inside dimension engaging the outside surface of the flow tube.

10. A Coriolis mass flow meter as claimed in claimed 9 wherein the mounting means has a substantially large mass as compared to the mass of the flow tube and the flow tube and the flow tube is formed such that it is stabilized about its center of gravity and the center of gravity of the mounting means.

11. A Coriolis mass flow meter comprising: a flow tube having an inlet end and an outlet end adapted to receive and exhaust fluid flow; a driver adapted to oscillate the flow tube at a resonant frequency thereof; sensors means adapted to generate signals proportional to the motion of the flow tube; mounting means having a first portion and a second portion, the first and second portions having mating surfaces including gripping means adapted for engaging the inlet and outlet ends of the flow tube, the portion of the flow tube between the engagement of the gripping means defining a sensing portion; bushing means adapted to be engaged on its outside dimension by the gripping means, the inside dimension of the bushing means adapted to engage the outside surfaces of the inlet and outlet ends of the flow tube, the bushing means adapted to limit the transfer of forces acting on the inlet and outlet ends of the flow tube to the sensing portion of the flow tube.

12. A Coriolis mass flow meter according to claim 11 further comprising brace means attached at one end to the mounting means and at the opposite end to the flow tube, the brace means adapted to limit lateral displacement of the flow tube transverse to the direction of the applied oscillation of a driver without substantially restricting the motion due to the Coriolis reaction of the fluid in response to the applied oscillation.

13. A Coriolis mass flow meter as claimed in claim 12 wherein the driver is adapted to oscillate the sensing portion at a resonant frequency of the flow tube greater than its fundamental resonant frequency so as to create a vibrational wave pattern having at least two local maximum amplitudes of vibration therein.

14. A Coriolis mass flow meter as claimed in claim 13 wherein the frequency of the applied oscillation of the drive is substantially the mode 2 frequency of the flow tube.

15. A Coriolis mass flow meter as claimed in claim 14 further comprising resonant pin means positioned at each end of the sensing portion of the flow tube adjacent the mounting means, the pin means adapted to resiliently clamp the flow tube so as to fix the resonant frequency of the sensing portion, the gripping force of the pin means being within the elastic deformation limits of the pin.

16. A Coriolis mass flow meter comprising: a continuous flow tube fixedly mounted at both ends, the flow tube adapted to receive fluid flow; a driver adapted to oscillate the flow tube at resonant frequency thereof; sensor means positioned on opposite sides of the flow tube equidistantly from the driver, the driver adapted to oscillate the flow tube at the second resonant frequency of the flow tube, the driver oscillation producing a vibrational pattern within the length of the flow tube having at least two local maximum of amplitudes of vibration and wherein the Coriolis reaction of the flow tube is substantially in resonance with the vibrational pattern; and means positioned at each end of the flow tube adjacent the fixed mounting thereof adapted to resiliently clamp the flow tube to fix the resonant frequency thereof.

17. A Coriolis mass flow meter as claimed in claim 16 further comprising brace means attached at one end to the fixed mounting of the flow tube and the opposite end to the flow tube substantially at the point of the application of the oscillation frequency by the driver, the brace means having a first portion and a second portion, the first and second portions generally forming an A-frame with the apex of the frame attached to the flow tube and the opposite ends of the first and second portions attached at separate locations on the fixed mounting.

18. A Coriolis mass flow meter comprising: a continuous flexible flow tube having an inlet and outlet portion adapted to receive and exhaust fluid flow, respectively; a driver adapted to oscillate the flow tube; sensors positioned on opposite sides of the flow tube equidistantly from the driver; and means positioned at each end of the flow tube adjacent the inlet and outlet portions of the flow tube for resiliently clamping the flow tube and to define the resonant frequency thereof, and means for fixedly mounting the flow tube, the mounting means comprising a first portion and a second portion, the first and second portions having mating surfaces including gripping means adapted for engaging the inlet and outlet portions of the flow tube, and bushing means adapted to be engaged on its outside dimensions by the gripping portions and the inside dimensions adapted to engage the outside surfaces of the inlet and outlet portions of the flow tube, the bushing means further adapted to limit transfer of forces acting on the inlet and outlet portions of the flow tube to the portion of the flow tube between the resilient clamp means.

19. A Coriolis mass flow meter comprising: a continuous flow tube adapted to receive fluid flow from a defined fluid stream, the flow tube fixedly mounted at its inlet and outlet ends and defining an unsupported length therebetween; vibration means adapted to oscillate the flow tube substantially at a resonant frequency thereof, the vibration means including flexible brace means fixed at one end to a base and at the opposite end to the flow tube, the brace means adapted to limit the amplitude of vibration of the flow tube at the position of attachment thereto, the vibration means further adapted to create local maximum amplitudes of vibration along the unsupported flow tube length on opposite sides of the brace means, the local maximums being substantially coincident with local maximum amplitudes of rotation of the flow within the flow tube; and sensor means adapted to generate signals proportional to the motion of the flow tube, the sensor means positioned at substantially the local maximum amplitudes of vibration created by the oscillation of the vibration means.

20. A Coriolis mass flow meter as claimed in claim 19 wherein the vibration means further comprises resonant weights attached to the unsupported length of the flow tube between the fixed end and the brace means, the resonant weights having a mass sufficient to create an amplification of the oscillation of the flow tube so as to produce the amplitude maximums as a result of the oscillation of the flow tube.

21. A Coriolis mass flow meter comprising: a continuous flexible flow tube including an inlet end and an outlet end adapted for communicating with a defined fluid stream and for receiving a fluid flow; mounting means having a first portion and a second portion, the first and second portions having mating surfaces including gripping means adapted for engaging the inlet and outlet ends of the flow tube over a substantially large surface area as compared to the cross-sectional area of the flow tube; bushing means provided within the gripping means, the outside dimension of the bushing means being engaged by the first and second portions, the inside dimension of the bushing means engaging the outside surfaces of the flow tube, the bushings adapted to limit transfer of forces acting on the inlet and outlet ends of the flow tube to the portion of the flow tube between the gripping portions; means on opposite sides of the flow tube adjacent the gripping portions adapted to resiliently clamp the flow tube to fix the resonant frequency of the unsupported flow tube length; driver means adapted to oscillate the unsupported length of the flow tube substantially at the second resonant frequency of the flow tube, the driver positioned at the center of the unsupported length of the flow tube; sensor means positioned on opposite sides of the flow tube equidistantly from the driver means, the sensor means having a predetermined mass supported on the flow tube; and flexible bracing means attached at one end to the mounting means and at the opposite end to the flow tube at the same position as the driver, the bracing means adapted to substantially limit displacement of the flow tube transverse to the direction of applied oscillation of the driver without substantially restricting the relative motion of the opposite sides of the flow tube due to the Coriolis reaction of the fluid in response to the oscillation, the bracing means further adapted to limit the amplitude of oscillation of the flow tube at its attachment thereto, the driver means, mass of the sensor means and bracing means reacting with one another so as to produce a vibrational wave pattern along the length of the flow tube having two local maximum amplitudes of vibration on opposite sides of the driver means and producing a Coriolis reaction by the flow within the flow tube having two local maximum amplitudes of rotation substantially coincident with the vibrational amplitude maximums, whereby the Coriolis reaction of the flow means and the vibrational pattern along the flow tube length are substantially in resonance.

22. An apparatus for measuring the mass flow rate of a fluid comprising: a continuous, flexible flow tube having a fixedly mounted input and outlet end for receiving an exhausting fluid flow; oscillation means for vibrating the flow tube perpendicular to the flow therein substantially at the second resonant frequency of the flow tube to induce a vibrating wave pattern that varies in amplitude along the length of the flow tube, the vibrating wave pattern producing two local maximum amplitudes of vibration moving in the same direction transverse to the direction of flow and having two local maximum amplitudes of rotation substantially coincident with the maximum amplitudes of vibration; sensor means located on or adjacent the flow tube for generating signals representative of the motion of the flow tube due to the vibrational wave pattern and the Coriolis reaction pattern of the fluid in response to the vibration by the oscillation means; and means for determining the mass flow rate through the flow tube from the sensor signals.

23. An apparatus as claimed in claim 22 wherein the oscillation means further comprises brace means attached to the flow tube at a position between the relative maximum amplitudes of vibration.

24. An apparatus as claimed in claim 23 wherein the oscillation means further comprises an electromagnetic driver, the brace means attached to the flow tube at substantially the same position as the driver.

25. A Coriolis mass flow meter comprising: a continuous flow tube adapted to receive an exhaust fluid flow, the flow tube fixedly mounted at opposite ends and substantially encircling its overall center of gravity; a base, the flow tube supported on the base at its ends; sensor means for emitting signals proportional to the motion of the flow tube; means for determining the mass flow through the flow tube from the sensor means signals; means for oscillating the flow tube transverse to the direction of flow and for creating two local maximum amplitudes of vibration; and means associated with the oscillating means for limiting the amplitude of displacement of the flow tube between amplitude maximums, the oscillating means attached to the flow tube at substantially the same position at the limiting means.

26. A Coriolis mass flow meter as claimed in claim 25 wherein the limiting means comprises a flexible brace means attached at one end to the base and at its opposite end to the flow tube.

27. A Coriolis mass flow meter as claimed in claim 26 wherein the flexible brace means has two side portions attached to one another to form an apex, the apex attached to the flow tube, and the opposite ends of the side members attached to the base.

28. A Coriolis mass flow meter as claimed in claim 26 wherein the oscillating means comprises resonant weights attached to the flow tube on opposite sides of the limiting means, the resonant weights having a mass sufficient to create an amplification of the oscillation of the flow tube on opposite sides of the limiting means and to produce the amplitude maximums as a result of the oscillation.

29. A Coriolis mass flow meter as claimed in claim 28 wherein the oscillating means is an electro-magnetic driver adapted to oscillate the flow tube substantially at a resonant frequency thereof.

30. A Coriolis mass flow meter as claimed in claim 29 wherein the resonant frequency of oscillation by the driver is substantially at a resonant frequency of the flow tube greater than the fundamental resonance.

31. A Coriolis mass flow meter as claimed in claim 29 wherein the frequency of oscillation by the driver is substantially the second resonant frequency of the flow tube.

* * * * *